(12) United States Patent
Zhang et al.

(10) Patent No.: US 10,314,069 B2
(45) Date of Patent: Jun. 4, 2019

(54) METHOD AND ARRANGEMENT ENABLING ADAPTIVE DETECTION OF SCHEDULING REQUESTS

(71) Applicant: Telefonaktiebolaget LM Ericsson (publ), Stockholm (SE)

(72) Inventors: Jianwei Zhang, Solna (SE); Patrik Rask, Sollentuna (SE); Ying Sun, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 140 days.

(21) Appl. No.: 15/320,084

(22) PCT Filed: Jul. 2, 2014

(86) PCT No.: PCT/SE2014/050841
§ 371 (c)(1),
(2) Date: Dec. 19, 2016

(87) PCT Pub. No.: WO2016/003338
PCT Pub. Date: Jan. 7, 2016

(65) Prior Publication Data
US 2017/0156157 A1    Jun. 1, 2017

(51) Int. Cl.
*H04W 72/12* (2009.01)
*H04L 1/00* (2006.01)
*H04W 24/02* (2009.01)

(52) U.S. Cl.
CPC ....... *H04W 72/1278* (2013.01); *H04L 1/0039* (2013.01); *H04W 24/02* (2013.01)

(58) Field of Classification Search
CPC . H04W 24/02; H04W 72/1278; H04W 72/04; H04W 72/12; H04W 76/00;
(Continued)

(56) References Cited

U.S. PATENT DOCUMENTS

| 2008/0165733 | A1* | 7/2008 | Xiao | ................ | H04W 72/1231 370/330 |
| 2010/0202420 | A1* | 8/2010 | Jersenius | ................ | H04L 47/10 370/337 |

(Continued)

FOREIGN PATENT DOCUMENTS

| CN | 102256280 A | 11/2011 |
| CN | 102474876 A | 5/2012 |

(Continued)

OTHER PUBLICATIONS

International Search Report and Written Opinion of the International Searching Authority, Application No. PCT/SE2014/050841, dated Mar. 23, 2015.

(Continued)

*Primary Examiner* — Robert J Lopata
(74) *Attorney, Agent, or Firm* — Sage Patent Group

(57) ABSTRACT

There is provided a method and a corresponding arrangement for enabling adaptive detection of Scheduling Requests (SRs). Information about the response to a transmitted grant is used to adjust threshold values relevant for the detection of SRs. By providing an adaptive mechanism for detection of SRs it is possible to reduce the number of grants being scheduled due to a detected signal wrongly interpreted as a SR.

34 Claims, 15 Drawing Sheets

(58) Field of Classification Search
CPC ................ H04B 7/2121; H04B 7/2123; H04J 2203/0069; H04Q 2213/394
USPC ....................................................... 370/329
See application file for complete search history.

(56) References Cited

U.S. PATENT DOCUMENTS

| | | | | |
|---|---|---|---|---|
| 2010/0238875 | A1* | 9/2010 | Sung | H04L 12/66 370/329 |
| 2011/0110240 | A1* | 5/2011 | Bergquist | H04W 74/0866 370/241.1 |
| 2011/0242990 | A1* | 10/2011 | Simonsson | H04W 72/085 370/242 |
| 2012/0084618 | A1* | 4/2012 | Choudhury | H03M 13/136 714/752 |
| 2012/0099451 | A1* | 4/2012 | Su | H04L 27/2601 370/252 |
| 2012/0106389 | A1 | 5/2012 | Baker et al. | |
| 2013/0034089 | A1* | 2/2013 | Nakashima | H04L 5/001 370/337 |
| 2013/0083713 | A1* | 4/2013 | Johansson | H04W 52/0225 370/311 |
| 2013/0084869 | A1* | 4/2013 | Johansson | H04W 76/20 455/436 |
| 2013/0163537 | A1* | 6/2013 | Anderson | H04W 72/1284 370/329 |
| 2014/0056243 | A1* | 2/2014 | Pelletier | H04W 74/04 370/329 |
| 2014/0092733 | A1* | 4/2014 | Johansson | H04W 52/0216 370/230 |
| 2015/0117342 | A1* | 4/2015 | Loehr | H04W 72/1284 370/329 |
| 2015/0208442 | A1* | 7/2015 | Bai | H04W 74/0875 370/329 |
| 2015/0230234 | A1* | 8/2015 | Choi | H04W 28/24 370/329 |
| 2016/0100430 | A1* | 4/2016 | Dabeer | H04W 28/0278 370/329 |
| 2016/0227495 | A1* | 8/2016 | Lee | H04W 56/00 |

FOREIGN PATENT DOCUMENTS

| | | |
|---|---|---|
| CN | 102754502 A | 10/2012 |
| CN | 102821477 A | 12/2012 |
| CN | 103297999 A | 9/2013 |

OTHER PUBLICATIONS

3GPP, Technical Specification, "3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.1.0 (Mar. 2014), 57 pp.

Office Action for Chinese Patent Application No. 201480080312.6, including English translation, dated Dec. 17, 2018 (11 pages).

* cited by examiner

METHOD AND ARRANGEMENT ENABLING ADAPTIVE DETECTION OF SCHEDULING REQUESTS

CROSS REFERENCE TO RELATED APPLICATION

This application is a 35 U.S.C. § 371 national stage application of PCT International Application No. PCT/SE2014/050841, filed on Jul. 2, 2014, the disclosure and content of which is incorporated by reference herein in its entirety. The above-referenced PCT International Application was published in the English language as International Publication No. WO 2016/003338 A1 on Jan. 7, 2016.

TECHNICAL FIELD

The proposed technology generally relates to a method enabling adaptive detection of scheduling grants and a corresponding arrangement, computer program and a computer program carrier.

BACKGROUND

The technology primarily relates to network communication systems that employ Uplink, UL, scheduling. A particular example of such a system is the Long Term Evolution, LTE, system. One of the main features of scheduling in such systems is that the User Equipment, UE, requests resources for UL transmissions from the serving network node, i.e. the eNodeB. That is, the UE acts to make the network node aware that it has data pending/waiting in the UE buffer for UL transmission. One particular way to make the network node aware of the pending data is to transmit a scheduling request, SR, to the network node. The SR is usually transmitted on the Physical Uplink Control Channel, PUCCH. As a result of detecting the SR, the network node responds by transmitting a grant, usually on the Physical Downlink Control Channel, PDCCH. That is, at detecting a SR in the network node such as an eNodeB, a scheduler will give the UE a comparably high priority so that the UE will get scheduled and receive its grant as soon as possible. The transmitted grant carries information relating to the resources that the UE might use for transmitting UL-data. Since UL-transmissions are sparse the resources has to be used wisely. Therefor a detection of SRs needs to be reliable and sensitive.

In CN103297999 (A) there is disclosed a method for adjusting fixed threshold values relevant for the detection of a scheduling request. The threshold values are adjusted based on a false alarm probability.

SUMMARY

The proposed technology aims to provide mechanisms that at least partially overcome some of the drawbacks within the art and ensures an efficient adaptive detection of Scheduling Requests, SRs. Such a mechanism makes it possible to reduce the amount of grants that are transmitted on the basis of incorrectly interpreted SRs.

It is a specific object to provide a method that enables an adaptive detection of a scheduling request, SR.

It is another specific object to provide an arrangement that enables an adaptive detection of a Scheduling Request, SR.

Yet another specific object is to provide a computer program comprising instructions, which when executed by at least one processor, cause the at least one processor to enable an adaptive detection of a Scheduling Request, SR.

Still another specific object is to provide a carrier comprising such a computer program.

These and other objects are met by embodiments of the proposed technology.

According to a first aspect, there is provided a method for enabling adaptive detection of Scheduling Requests, SRs. The method comprises the step of obtaining information about a responding action to a grant transmitted to a User Equipment, UE, the grant being triggered by an earlier detected signal interpreted as a SR transmitted from the UE. The method also comprises the step of adjusting, based on the information obtained, at least one threshold value relevant for determining if a detected signal corresponds to a SR from the UE.

According to second aspect there is provided an arrangement configured to enable adaptive detection of Scheduling Requests, SRs. The arrangement is configured to obtain information about the responding action to a grant transmitted to a User Equipment, UE, the grant being triggered by an earlier detected signal interpreted as a SR transmitted from the UE. The arrangement is also configured to adjust, based on the information obtained, at least one threshold value relevant for determining if a detected signal corresponds to a SR from the UE.

According to a third aspect there is provided a computer program comprising instructions, which when executed by at least one processor, cause the processor(s) to read information about a responding action to a grant transmitted to a User Equipment, UE, the grant being triggered by an earlier detected signal interpreted as a SR transmitted from the UE, and adjust, based on the information, at least one threshold value relevant for determining if a detected signal corresponds to a SR from the UE.

According to a fourth aspect there is provided a carrier comprising the computer program of the third aspect. By way of example, the carrier may be one of an electronic signal, an optical signal, an electromagnetic signal, a magnetic signal, an electric signal, a radio signal, a microwave signal, and a computer-readable storage medium.

According to a fifth aspect there is provided an arrangement for enabling an adaptive detection of Scheduling Requests, SRs. The arrangement comprises a reading module for obtaining information about a responding action to a grant transmitted to a User Equipment, UE, the grant being triggered by an earlier detected signal interpreted as a SR transmitted from the UE. The arrangement also comprises an adjusting module, for adjusting, based on the information obtained, at least one threshold value relevant for determining if a detected signal corresponds to a SR from the UE.

Embodiments of the proposed technology enables a more reliable detection of scheduling requests. This makes it possible to reduce the number of transmitted grants which in turn will provide for a more efficient use of network resources.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

Figure 1:
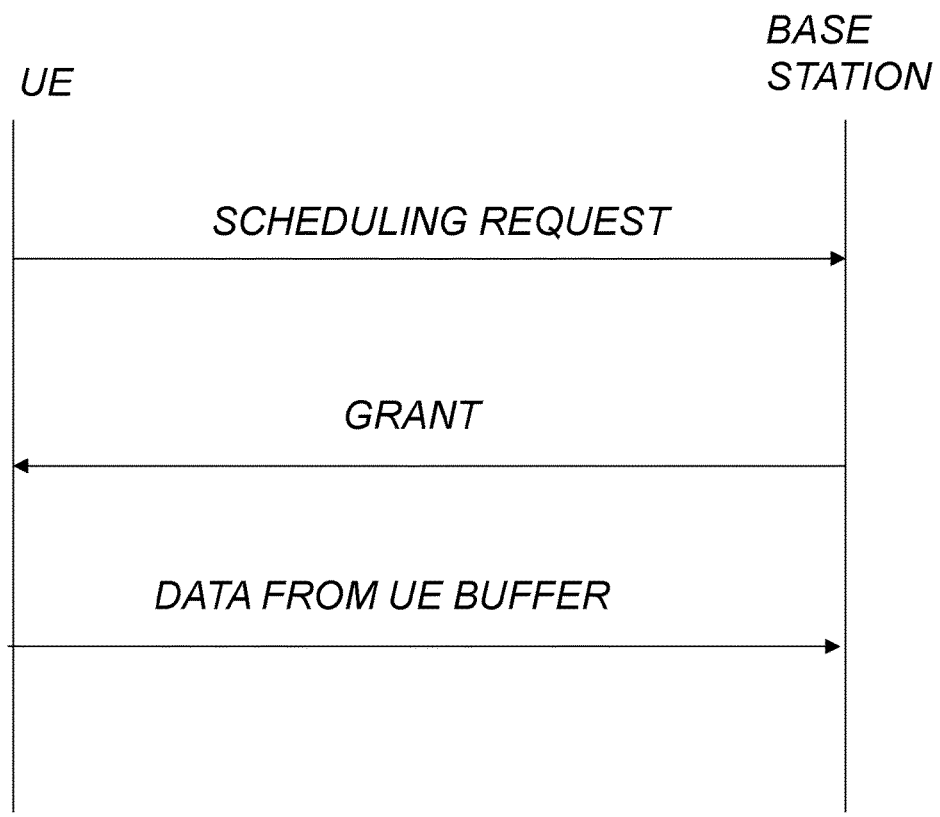
FIG. 1 is a signaling diagram illustrating the exchange of a Scheduling Request, SR and a grant between a network node and a User Equipment. The exchange also includes the transmission of data as a response to the grant.

For a better understanding of the proposed technology, it may be useful to begin with a brief overview of the procedure behind scheduling request triggered grants. To this end we refer to the schematic signalling diagram of FIG. 1.

A Scheduling Request, SR, transmission is usually detected in the network by comparing the signal quality of the received SR with a signal with a predefined threshold. If the signal quality of the detected signal is higher than the threshold, a SR transmission is deemed to have been detected while otherwise, the network node deems that no SR has been transmitted. Based on the outcome of the comparison the UE will either transmit uplink data based on a transmitted grant or wait for the next opportunity.

Figure 2:
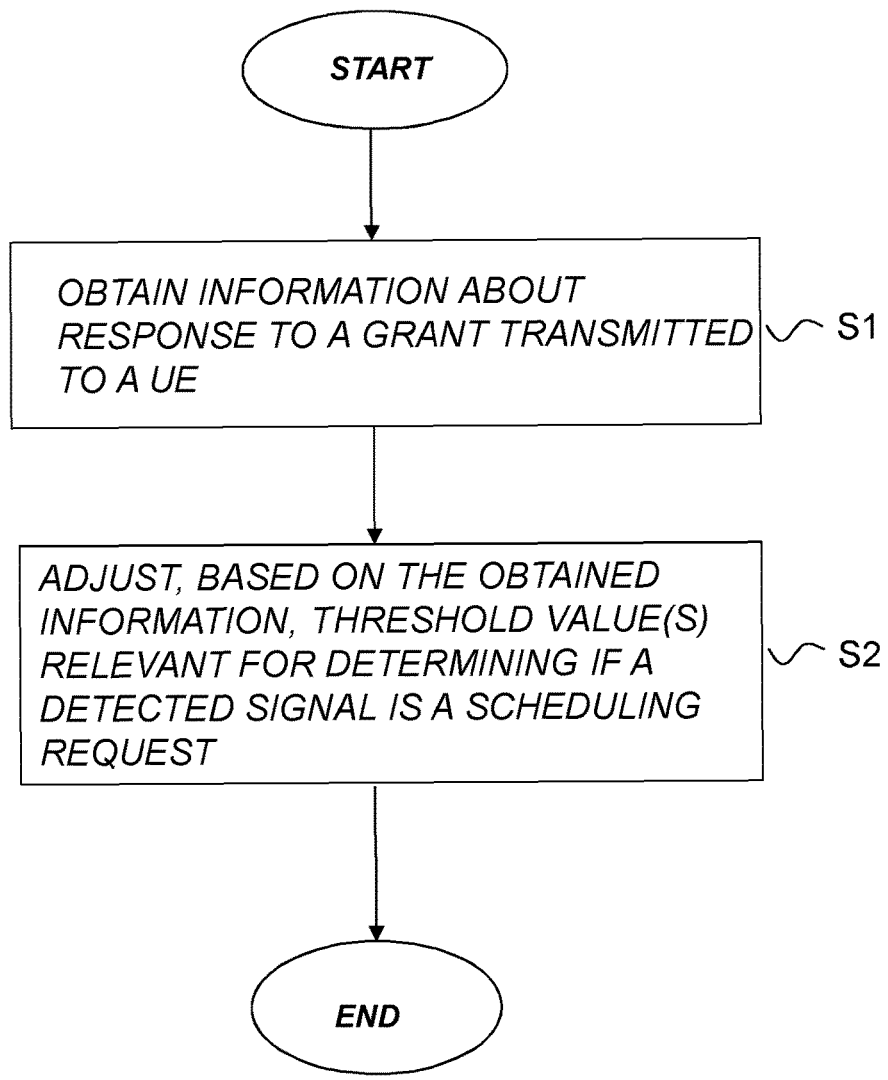
FIG. 2 is a schematic flow diagram illustrating a particular embodiment of the proposed method for enabling adaptive detection of Scheduling Requests, SRs.
Figure 3:
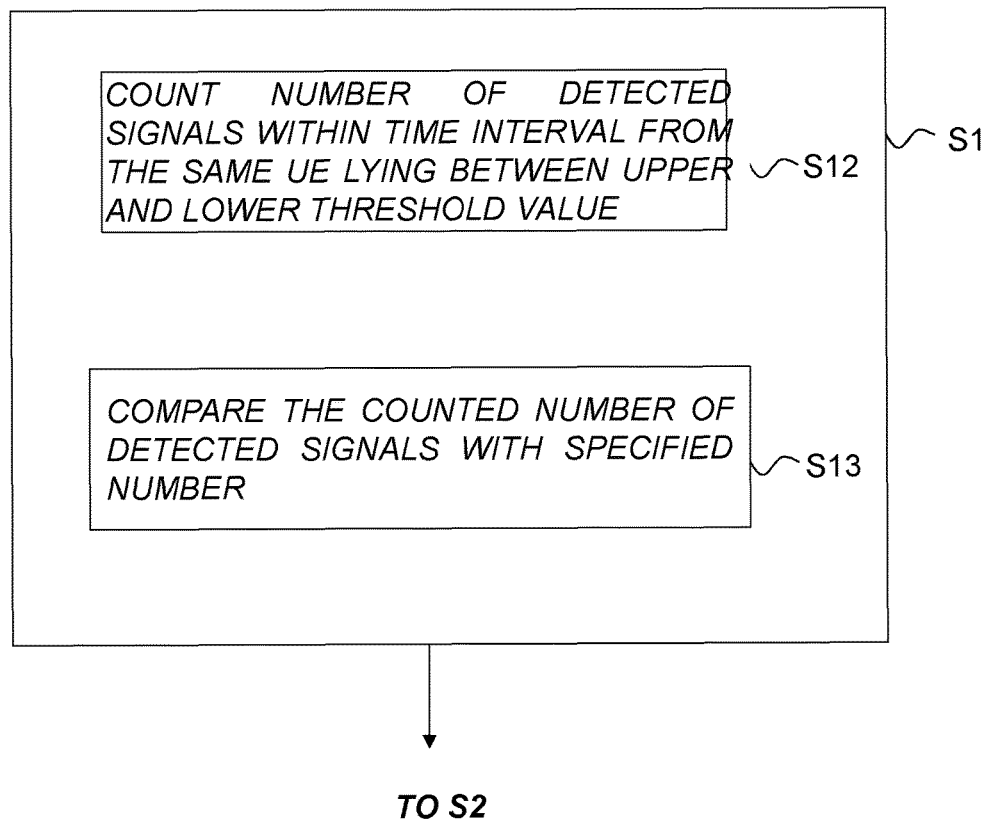
FIG. 3 is a schematic flow diagram illustrating an exemplary embodiment of the proposed method for enabling adaptive detection of Scheduling Requests, SRs.

One particular problem related to this is that the resources might get wasted if grants are transmitted to UEs whose UL data buffers are empty. In other words, if a network node, in a specific TTI or a specific instance of time, detects a signal and wrongly interprets the detected signal as a SR from a particular UE it will trigger a transmission of a grant. This grant will be transmitted to the UE that was interpreted as the transmitter of a SR. Since the detected signal might not necessary be a SR, it could for example be noise, or the quality of the signal could have been compromised due to for example high interference and bad channel quality, the UE who receives the grant might have an empty uplink transmission buffer and thus a grant will be wasted. Since a UE might be ordered to answer a received grant with a buffer status report a wrongfully interpreted SR might cause a lot of unnecessary retransmissions. The precious radio and processing resources that could get allocated to other UEs are thus wasted According to an embodiment of the proposed technology, schematically illustrated in the flow diagram of FIG. 2, there is provided a method for enabling adaptive detection of Scheduling Requests, SRs. The method basically comprises the steps of:

obtaining S1 information about a responding action to a grant transmitted to a User Equipment, UE, the grant being triggered by an earlier detected signal interpreted as a SR transmitted from the UE;

adjusting S2, based on the information obtained, at least one threshold value relevant for determining if a detected signal corresponds to a SR from the UE.

The proposed method provides for a mechanism that enables a robust and reliable adaptive detection of Scheduling Request(s).

By providing reliable and robust detections of SRs the amount of wrongly interpreted SRs will decrease. This will ascertain that the number of wrongly transmitted grants will be decreased, leading in turn to a smaller number of retransmissions and a more resource effective use of the provided radio resources. Since the method are adaptive the adjustment of threshold values could be performed on the level of a specific UE. If, as an example, a specific UE is prone to transmit SRs with low signal quality the adaptive method will provide for a mechanism whereby the threshold values for this particular UE will be appropriately adjusted. This will also lead to a decrease in the number of transmissions as compared to a once and for all fixed threshold value since the specific UE does not have to transmit SRs repeatedly and hoping that the signal quality of one particular SR will be above the fixed threshold value.

Moreover, the proposed method does not rely on any post-processing of statistics nor is it dependent on any particular statistical model to adjust the threshold values. Statistics may however complement the proposed method in certain embodiments of the invention.

According to an exemplary embodiment of the method, the step S1 of obtaining information comprises obtaining information whether the responding action to the transmitted grant was a message received from the UE and the step S2 of adjusting at least one threshold values is based on whether a message was received.

In this way it will be possible to check whether a detected signal is truly a SR by obtaining information relating to the response to a transmitted grant. This information is very reliable and provides a good basis for adjusting the threshold values that is free of statistical processing and statistical uncertainties.

By way of example, the proposed method could comprise, in the case a message was received as a response to the transmitted grant, a step S1 of obtaining information that comprises obtaining information whether the received message contained uplink data and wherein the step S2 of adjusting threshold values comprises to decrease a threshold value if the received response contained uplink data.

By utilizing information that the received response contained data provides for a reliable basis to determine that the earlier detected signal indeed corresponded to a SR. In this way the adjustment of the threshold values will be based on reliable information and thus a robust and fault-tolerant SR detection is enabled.

In another example of an embodiment the proposed method could, in the case a message was received as a response to the transmitted grant, comprise a step S1 of obtaining information that comprises obtaining information whether the received message was padded and contained a zero size buffer report, and a step S2 of adjusting threshold values that comprises to increase a threshold value if the received message was padded and contained a zero size buffer report.

By using information that the received response to the grant was empty provides for a reliable basis to determine that the earlier detected signal was not a SR. Hence the adjustment of the threshold values will be based on reliable information and thus a robust and fault-tolerant SR detection is enabled.

In still another exemplary embodiment of the method, in the case no response to the transmitted grant was received, the step S2 of adjusting a threshold value comprises to increase the threshold value.

That no response is received is a clear indication that the UE is in sleep mode or inactive and not about to transmit uplink data. This information is used to increase the threshold value which will ascertain that even UEs that are inactive or in sleep mode will have their threshold values adjusted.

In a possible exemplary embodiment of the method the threshold values comprises two different threshold values, an upper threshold value and a lower threshold value, the upper threshold value providing a threshold value relevant for determining if a detected signal is a SR and the lower threshold value providing a threshold value relevant for determining if a detected signal is not a SR, and the step S1 of obtaining information comprises obtaining information about a responding action to a grant transmitted to a User Equipment, UE, triggered by an earlier detected signal interpreted as a SR transmitted from the UE and the step S2 of adjusting comprises adjusting the threshold values based on the responding action to a grant transmitted to a UE triggered by an earlier detected signal interpreted as a SR transmitted from the UE.

By providing two separate threshold values the proposed method will enable a more finely grained detection mechanism where signals that are close to either of the threshold values can be further analyzed. This will in turn provide for a reduction of unnecessary retransmissions since a specific UE does not have to repeatedly transmit SRs.

In a possible example of an embodiment of the method the upper threshold value is increased if the responding action to the transmitted grant is a message received from the UE that contained uplink data and decreased if the responding action to the transmitted grant was a message received from the UE that was padded and contained a zero size buffer report.

Thus the upper threshold value might be adjusted according to what has been describe earlier and provides for all the advantages associated to those embodiments.

In still another exemplary embodiment of the proposed method the upper level threshold is increased if no response to the transmitted grant was received from the UE.

This is analogous to what has been described earlier in relation to the adjustment of a single threshold value and the advantages of this particular embodiment are the same.

In a possible embodiment of the proposed method, in the case no response to the transmitted grant was recorded, the step S1 of obtaining information might comprise the further step S12 of counting the number of detected signals within a specified time interval from the same UE lying between the upper threshold value and the lower threshold value and adjust the upper and lower threshold values based on the counted number of detected signals.

In this way the method enables a mechanism that also take into consideration the scenario where a specific UE transmit a number of SRs that falls below the threshold value but whose signal quality are too good to be deemed as a falsely detected SR. By counting the number of consecutively detected signals having signal characteristics that lies in the interval between the upper and lower threshold value the method enables an adaptive mechanism whereby the threshold values will be adjusted even in the case where a single SR is deemed to lie below the upper threshold value.

By way of example, an embodiment of the proposed method comprises the step S13 of comparing the counted number of detected signals with a specified number providing indications that the detected signals corresponds to a SR and wherein the upper threshold value is decreased if the comparison shows that the counted number is above the specified value.

In this way the proposed method enables an adaptive detection of SRs based on an adjustment of the threshold values that utilizes information about the number of detected signals whose signal characteristics falls within a specific interval bounded by an upper threshold value and a lower threshold value. This will provide a reliable basis for adjusting the threshold values.

In still another embodiment of the proposed method the at least one threshold value comprises a threshold value for a signal characteristic used to differentiate between a detected SR and a detected general signal.

The signal characteristic is in an exemplary embodiment of the method a measure of the strength of the detected signal.

Figure 15:
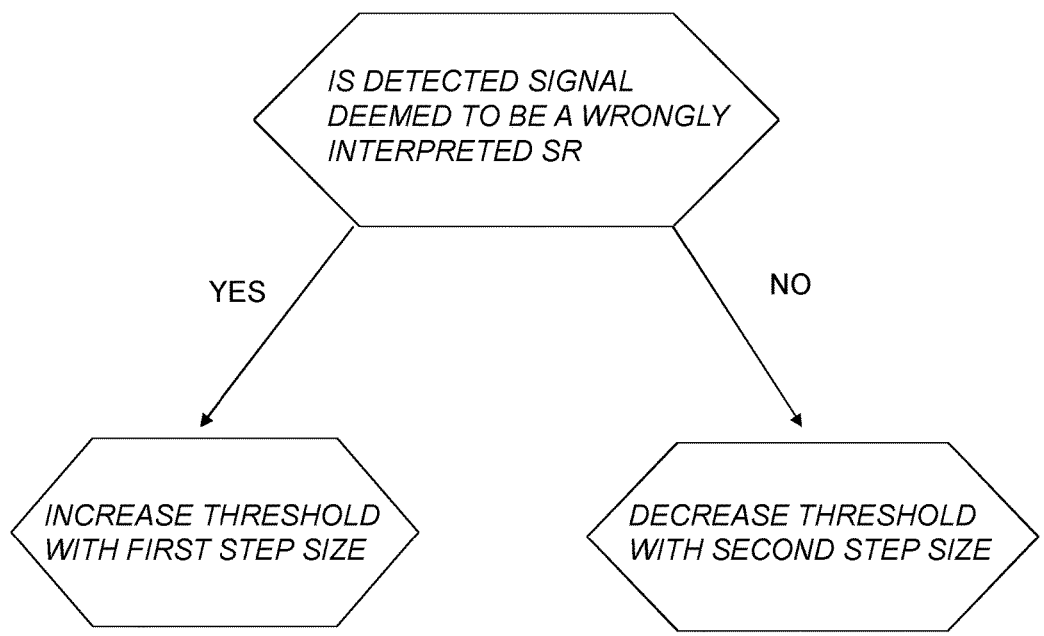
FIG. 15 is a schematic diagram illustrating a flow for adjusting threshold values with step valued sizes.

FIG. 15 illustrates schematically how an embodiment of the method adjust the threshold values by increasing the threshold value a first amount if the detected signal is deemed to be a wrongly interpreted Scheduling Request, SR, and correspondingly decreases the threshold value with a second amount if the detected signal was deemed to be a correctly interpreted Scheduling Request, SR. The first and second amounts might correspond to pre-defined steps, or step sizes, a first step and a second step, where the first step corresponds to the amount that the threshold value should be increased in case a detected signal was deemed to be a wrongly interpreted SR and the second step size corresponds to the amount that the threshold should be decreased in case a detected signal was deemed to be a correctly interpreted signal.

In an optional embodiment could the predefined steps be the same for both increasing and decreasing the threshold values.

In an alternative exemplary embodiment of the method could the threshold values be adjusted with predefined steps that are different based on whether the threshold values should be increased or decreased.

In this way it will be possible to adjust the threshold values based on, for example, the pattern of traffic flow. If there is a lot of traffic within the network the threshold value(s) might be increased with a specific step size different from the step size used to decrease the threshold value(s). Since the radio resources are strained during heavy traffic it might prove advantageous to increase the threshold value(s) with a larger step size than the corresponding decrease of threshold value(s) to further limit the number of grants transmitted due to signals wrongly detected as SRs. This will provide for a more robust and smooth traffic flow during very active traffic.

Figure 14:
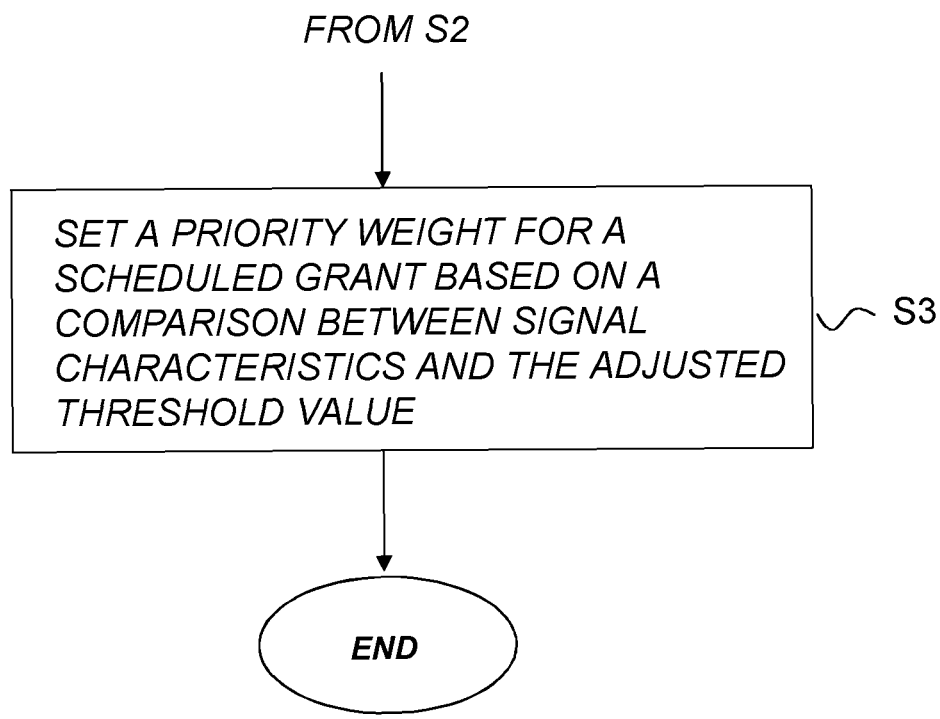
FIG. 14 is a schematic flow diagram illustrating a particular embodiment of the proposed method for enabling adaptive detection of Scheduling Requests, SRs. Here it is illustrated that a priority weight is set based on a comparison between signal characteristics and adjusted threshold values.

Another possible embodiment of the proposed method comprises a further step S3 of setting a priority weight for a scheduled grant based on a comparison between signal characteristics of a detected signal and the adjusted threshold values. This embodiment is schematically illustrated in the flow diagram of FIG. 14.

In other words, if a signal is detected a comparison is made between signal characteristic(s) of the detected signal and the adjusted threshold value(s). The outcome of such a comparison acts as a basis for providing a possible scheduled grant with a priority weight or equivalently a scheduling weight. A scheduling weight is a representation of the priority given to the scheduled grant, that is, a measure that can be used to determine whether a scheduled grant should be transmitted to a UE or not. If, for example, a particular detected signal, after a comparison with the adjusted threshold values, is considered to be a SR with high probability the corresponding scheduled grant will be provided with a priority weight representing a high priority. A detected signal where the comparison shows that the detected signal has low probability to be a SR will instead obtain a grant with a priority weight representing a low priority. In this way a comparison between signal characteristics and the adjusted threshold values provides a mechanism for providing scheduled grants with scheduling weights.

There are several possible ways to assign such probabilities to a detected signal by comparing the signal characteristics of the detected signal with the threshold value. As a first example it is possible to accord a high probability to a detected signal if the value of the signal characteristic used for the comparison lies above the threshold value with some specified margin. In such a scenario it could be deemed that the detected signal carries a high probability of being a correctly detected SR. In the particular case where the signal characteristic is signal strength it might also be possible to associate a high probability of being a correctly detected SR by creating the ratio between the signal strength and the threshold value. Different ratios might then be mapped to predefined probabilities where certain specified predefined probabilities acts as indicators that either the detected signal has a low probability of being a SR or a high probability of being a SR, respectively. There are numerous alternative ways of assigning probabilities to a detected signal by comparison with a threshold value, the details of which are not essential for the proposed technology. Moreover, the actual numerical values relevant for assigning high and low probabilities is mostly an implemental issue and the actual value(s) could be altered based on the expected traffic flow.

If a detected signal has been assigned a high probability of being a detected SR it is possible to accord the corresponding grant with a priority weight providing indications that the transmission of this particular grant should be prioritized since it carries a low risk of being a wasted grant. This is referred to as providing a scheduled grant with a priority weight representing a high priority. Contrary to this, a detected signal assigned a low probability of being a detected SR is accorded a priority weight providing indications that a transmission of the corresponding grant carries a substantial risk of being wasted. The transmission of such a scheduled grant is therefore not prioritized and is referred to as a grant with a priority weight representing a low priority.

In a very simple example included merely to facilitate the understanding of the mechanisms it is possible to consider a ratio between the signal strength of the detected signal and the threshold value. If this ratio is equal to, or above, one, the grant is accorded a scheduling weight one, while if the ratio is below one, the grant will be accorded the priority weight zero. The case where the ratio was equal or above one thus accords the priority weight one to the grant. The priority weight one might correspond to the same priority as is accorded to a grant based on a buffer status report message from a UE that provides information that the UE have data for uplink transmission. That is, when the UE has provided information that data to be transmitted on the uplink is present in the buffer. Hence grants with high priority will be scheduled before grants will low priority. It should be noted that this is a particularly simple example. The weights might in another example be accorded by comparing the ratios with a, for example, monotonically increasing probability function that maps certain probabilities to the obtained ratios.

The mechanism for providing grants with high and low priority weights is useful when there is a lot of traffic within the network and a lot of scheduled grants to be transmitted. To accord scheduled grants this type of different rank in priority based on the probabilities of being rightly or wrongly detected SRs could therefor further improve the resource management of scheduled grants.

The above mentioned mechanism might be complemented with further statistical information about a particular UE to improve the accuracy of the scheduling weight setting. Such information might be related to the probability that a detected signal deemed to be a SR from a specific UE is wrongly interpreted as a SR. In such a case the scheduled grant will be provided with a low priority if it is deemed, with high probability, that the detected signal is a wrongly detected SR. A particular way to generate, or collect, such statistical information will be described in a later section.

To provide for a better understanding and appreciation of the proposed technology, a few non-limiting examples will now be described with reference to FIGS. 8-12.

These examples are added merely to facilitate the understanding of certain steps of the proposed technology and are not to be considered as limiting.

First the procedure leading to a detection of a Scheduling Request, SR, will be described in connection with a Long Term Evolution system, LTE system.

Figure 8:
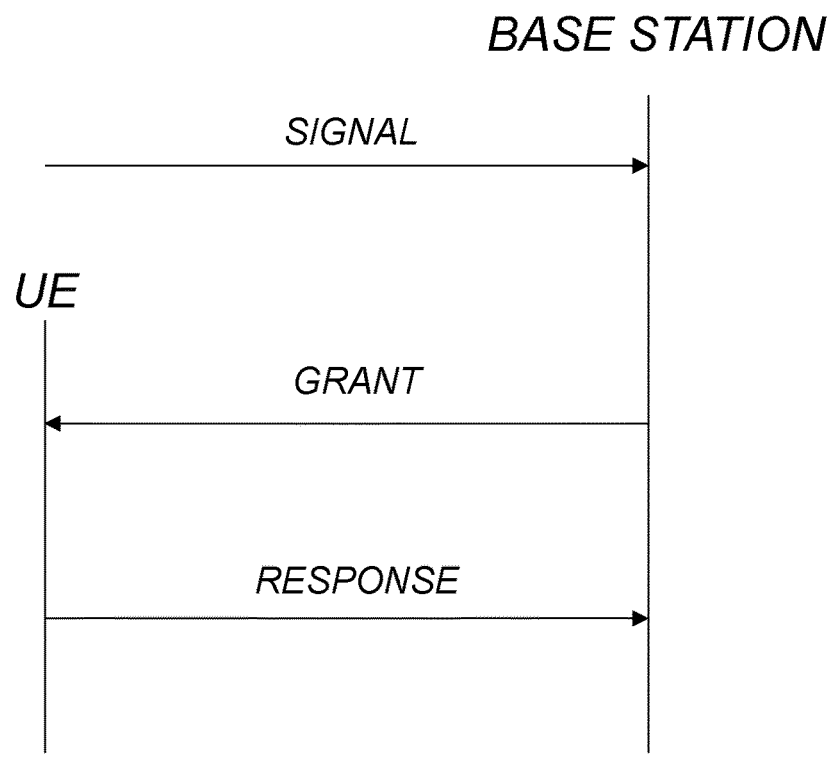
FIG. 8 is a simplified diagram illustrating the signaling for enabling an adaptive detection of a Scheduling Request, SR, according to an embodiment.

An exemplary overall signaling structure is schematically illustrated in FIG. 8. A signal is detected by the network node, i.e. the eNodeB of the LTE system. This detected signal is interpreted as a SR and a grant is transmitted to the UE associated to the detected SR. This grant will lead to some responding action from the UE. In this particular example the responding action is that the UE transmit a response to the eNodeB.

In other words, initially the eNodeB that serves the UE starts monitoring the UE from the point in time when a signal interpreted as a SR was detected. The eNodeB keeps track of the content of uplink transmission after a grant was transmitted as a response to the SR to decide whether the detected signal corresponded to SR or is a wrongly detected SR.

The procedure can be applied either to detect a false SR when the UE is operating normally during ordinary transmission or to a situation where the SR is detected with Discontinuous Reception, DRX, activated. That is, when the UE is in sleep, or equivalently, when the UE receiver is turned off. Both of these cases will be described below.

Figure 9:
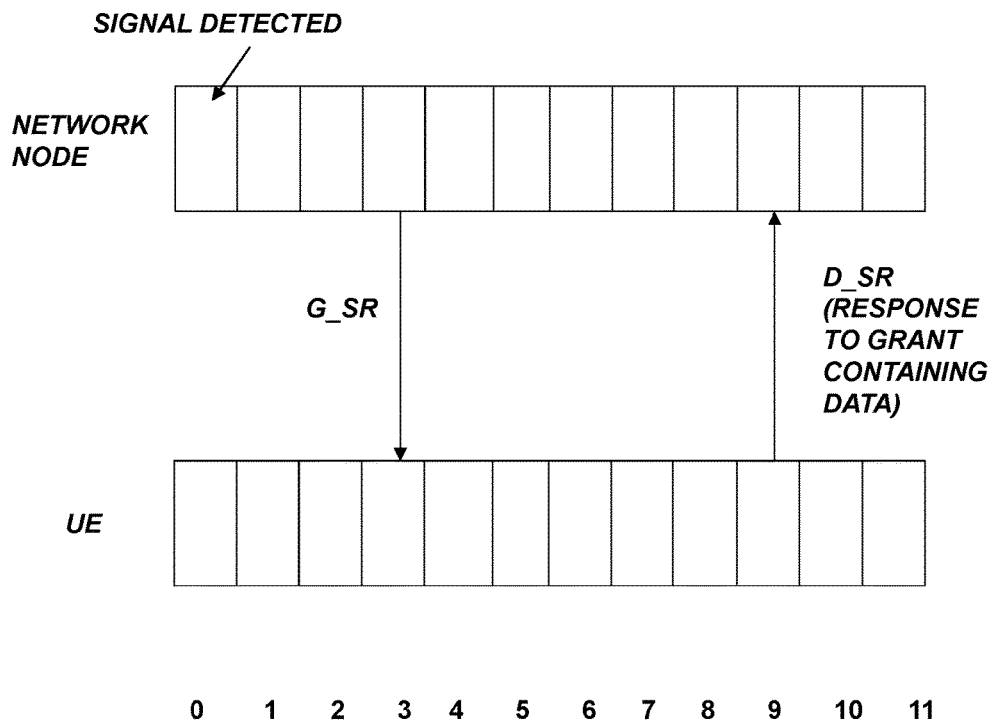
FIG. 9 is a simplified diagram illustrating the signaling between a network node and a UE for enabling adaptive detection of a Scheduling Request according to an embodiment where the response from the UE to the grant is a transmission containing data.
Figure 10:
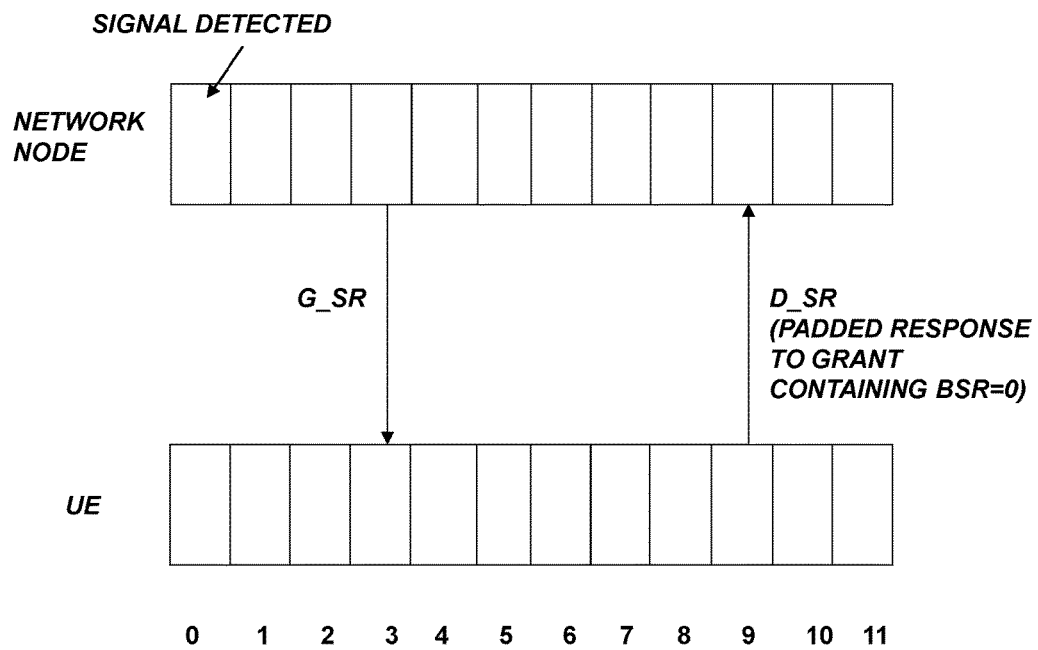
FIG. 10 is a simplified diagram illustrating the signaling between a network node and a UE for enabling adaptive detection of a Scheduling Request according to an embodiment where the UE, as a response to the grant, transmits a padded response with a Buffer Size Report, BSR, =0.
Figure 11:
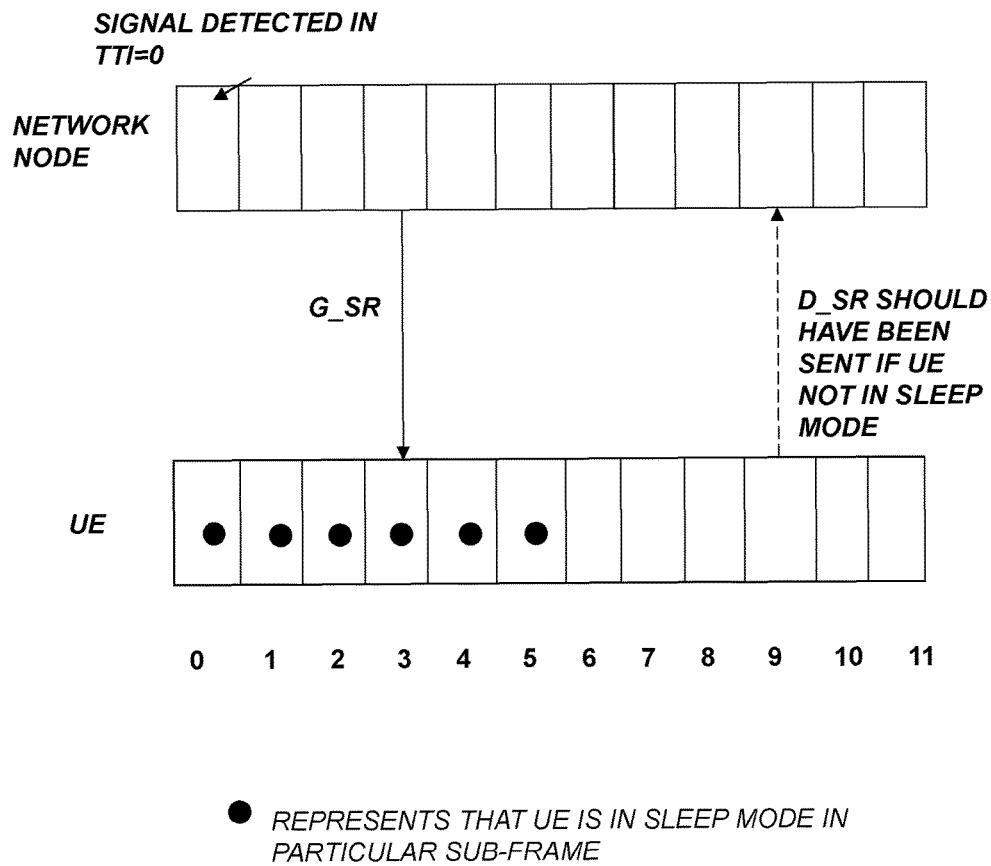
FIG. 11 is a simplified diagram illustrating the signaling between a network node and a UE for enabling adaptive detection of a Scheduling Request in the case where the UE is in Discontinuous Reception, DRX, sleep mode and no response to the grant is transmitted from the UE.

Reference is now made to the example disclosed in FIG. 9. In FIG. 9 are the Transmission Time Interval, TTI, sub-frames indicated by numerals 0-11.

In step 1 the eNodeB will act to receive UE data after a signal interpreted as a SR was detected. At a certain sub-frame, the eNodeB expects to receive UE data as a consequence of the grant that been previously assigned to the UE. In the example illustrated in FIG. 9, the eNodeB detects a signal interpreted as a SR at sub-frame 0. At sub-frame 3 the SR is scheduled and the grant, denoted G_SR, sent. The eNodeB will prepare to decode the uplink transmission, denoted D_SR, at sub-frame 9.

In an optional step 2 could the eNodeB check whether there is any pending transmissions. A pending transmission is a transmission that was not correctly received, that is the Cyclic Redundancy Check, CRC was not deemed ok, or the detected signal quality, i.e. the energy, was too low, due to for example Discontinuous Transmission, DTX, or the maximum transmission attempts were not reached. The check could be done for all expected transmissions at the correspondent reception sub-frames until all the transmissions are received correctly or the maximum transmission attempts have been reached. The eNodeB might start the step 3 below when the criteria is met.

In step 3, the eNodeB decides whether the signals detected during the period of interest are wrongly interpreted as SRs. Below three distinct cases relating to wrongly interpreted SRs will be described.

Case 1 relates to a scenario according to a standard of REF [1] where a SR is triggered at the UE side only in the case that there is new data arriving in the UE buffer. This standard scenario also specifies that if the UE receives a grant and there is no data in the UE buffer, the UE is ordered to transmit a padded response with a zero buffer status report. Based on this the eNodeB can make a decision whether a detected signal is a SR if the uplink transmission, or the uplink transmissions, received from the time when the signal was detected to the time when the evaluation of the received uplink message showed that it contained only padding and zero size buffer status report. An exemplary signaling diagram of this particular case is given in FIG. 10. From the figure it can be seen that the detected signal will be deemed to be a wrongly detected SR since response is a padded response, that is, the data received at sub-frame 9 are paddings with a zero size buffer status report.

Case 2 describes the case where a signal is determined to be wrongly interpreted as a SR when a DRX feature is activated. That is, in the scenario when the UE has deactivated the receiver. According to Ref [1] the UE is going to wake up from DRX sleep state when a SR is sent. On the eNodeB side, when the DRX feature is activated and the signal is detected during a DRX sleep period, eNodeB might assume that the UE wakes up and that the grant triggered by the SR will be sent. If the detected signal is wrongly interpreted as a SR, the UE might still be in a sleep state without monitoring the Physical Downlink Control Channel, PDCCH, and will therefore not be able to receive the grant. Since no grant was received the UE will not be able to transmit data on the uplink. This is schematically illustrated for this exemplary case in FIG. 11 On the eNodeB side, at the expected reception sub-frame the received signal energy will be lower than the energy detection threshold for a Physical Uplink Shared Channel signal, PUSCH signal. This will be interpreted as a detected PUSCH DTX.

To determine whether detected signal corresponds to a wrongly interpreted SR it is possible to check if DTX is detected in the allocated PUSCH resource. If a DTX is detected and at the time of the initially detected signal the UE was in DRX sleep and if the estimated PDCCH channel quality is satisfying, it is assumed that the detected signal has been wrongly interpreted as a SR. The estimated PDCCH channel quality might be obtained through a Channel Quality Indicator, CQI, reported by a specific UE to the eNodeB.

Figure 12:
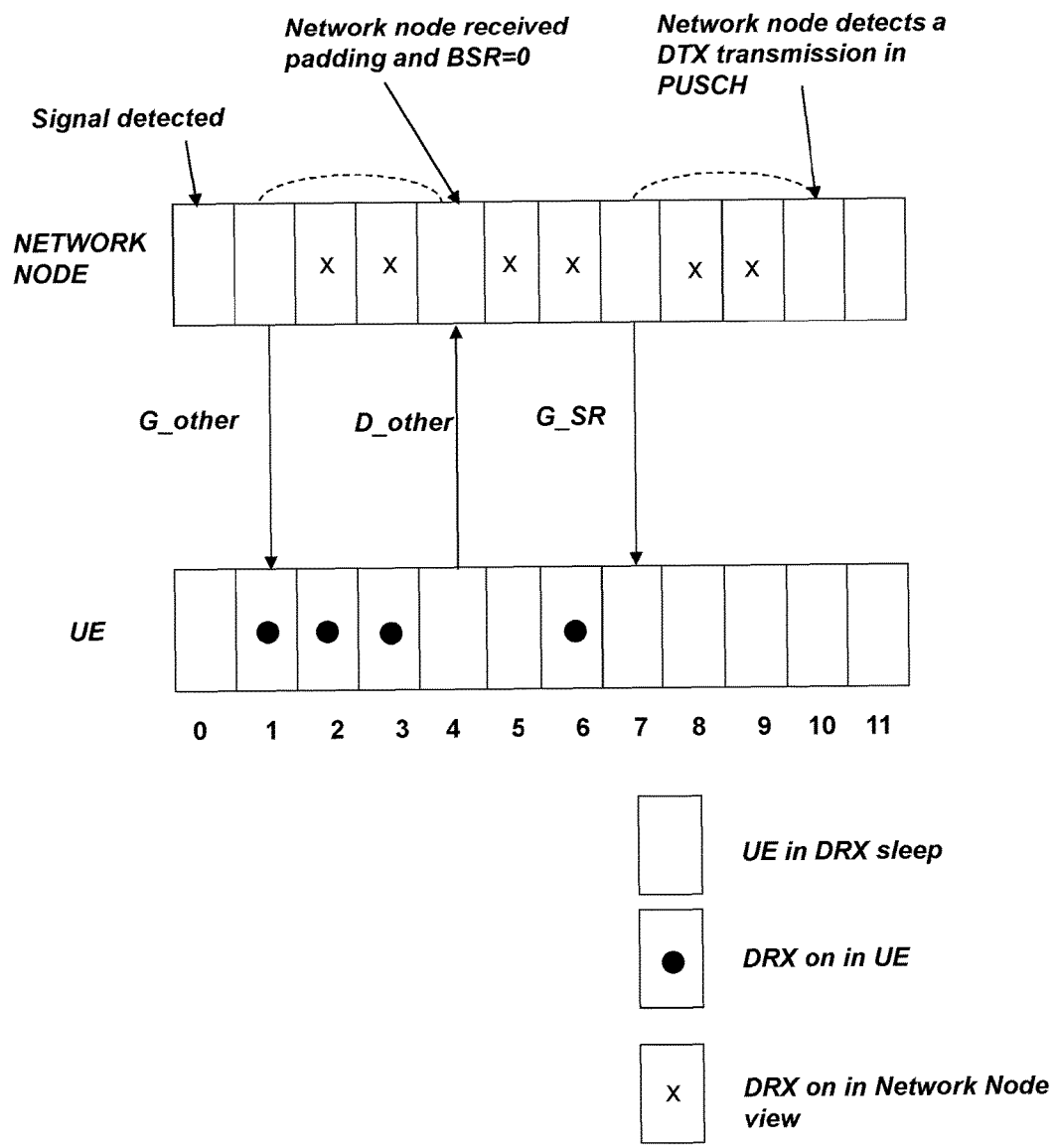
FIG. 12 is a schematic signal diagram illustrating the signaling between a network node and a UE in a particular example of the proposed technology.
Figure 13:
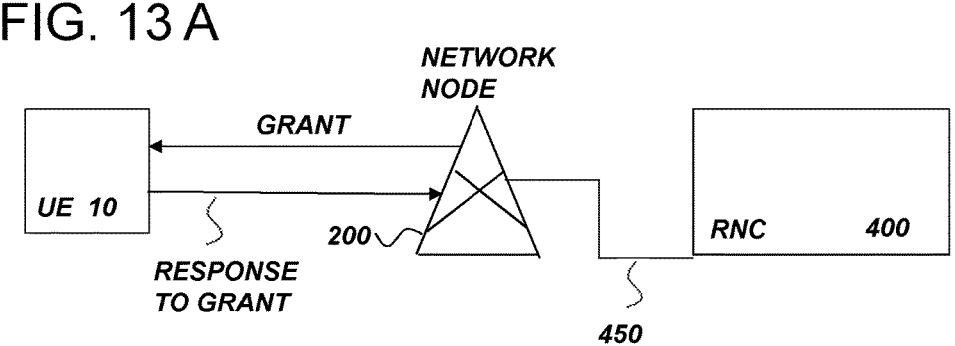
FIG. 13A is a schematic signal diagram illustrating an embodiment wherein the method steps are performed by a network node.
FIG. 13B is a schematic signal diagram illustrating an embodiment wherein the adjustment of the threshold values are performed by a Radio Network Controller controlling the network node serving the UE.
Figure 13:
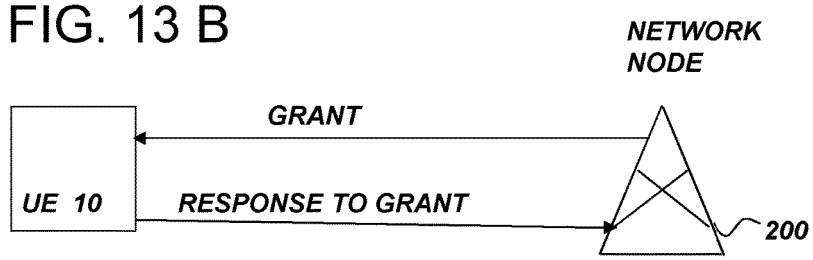

Case 3 relates to a more complicated scenario which is illustrated schematically in FIG. 12. Here it is assumed a relatively high load scenario where the grant triggered by the detected signal interpreted as a delayed SR. It is a scenario showing the combined behavior of Case 1 and Case 2 above. In this example, the detected signal is detected on sub-frame 0 and scheduled on sub-frame 7. It should be noted that the particular sub-frames used are purely illustrative. In the case the signal corresponds to a falsely detected SR, the grant G_SR is sent at DRX sleep. This will result in a DTX detected on sub-frame 10 on PUSCH. Coincidentally, at sub-frame 1 when DRX is on duration, the eNodeB schedules the UE due to other causes than the detected signal and a grant, G_other, is sent. As a response to this grant, the UE will transmit padding and zero size buffer status report at the sub-frame 4. So the criteria used to judge whether a detected signal was wrongly interpreted as a SR is that the all the receptions, from the detected signal to the maximum number of transmission attempts reached, are paddings plus zero buffer status reports, or PUSCH DTXs with good PDCCH channel quality.

To summarize the above exemplary case, an eNodeB might decide whether a detected signal corresponds to a wrongly interpreted SR detection based on the following schematic algorithm:

IF (All transmissions are decoded with CRC deemed Ok and the decoding results are paddings plus Buffer Status Report, BSR, =0)
OR
(if the signal detected at DRX sleep results in a PUSCH DTX &PDCCH SINR>TH)
OR
(All the pending transmissions are received as either PUSCH DTX & PDCCH CQI>TH) or (paddings with zero BSR whenever CRC deemed Ok)

THEN
    Signal is wrongly interpreted as a SR.
END

The above provided examples illustrates how it can be determined that a detected signal corresponds to a falsely detected SR. According to the proposed technology, this information is used to adjust the threshold value(s) relevant for distinguishing a detected signal from a genuine SR thus enabling an adaptive SR detection.

It should be noted that the obtained information relating to whether a detected signal was correctly or incorrectly interpreted as a SR also could be used as a means to collect statistics relating to detected signals that are wrongly interpreted as SRs. Hence, in such a statistic collecting procedure there might follow a step where the number of detected signals wrongly interpreted as a SR is increased with 1 when it has been determined that a detected signal corresponds to a falsely detected SR.

A possible addition to such a statistic collection feature is to provide a further step where, in the case a detected signal is correctly interpreted as a SR, the number of correct SR detections is increased with 1.

The statistics of SR false detection might then be collected and further used in different adaptive schemes. Such statistics information could be for example the probability of false detection of SRs. Number of falsely and correctly detected SRs are counted and used as input to, for example, provide a scheduling weight or a specifically set SINR threshold for that particular UE. A scheduling weight for a particular UE might for example be determined by the number of falsely detected SRs associated to a specific UE. If a large number of falsely detected SRs are associated to a particular UE the grants to be transmitted to this UE will be provided with a low scheduling weight. On the contrary a larger number of correctly interpreted SRs, or a lower number of falsely detected SRs, associated to the UE will lead to a larger scheduling weight for the grants to be transmitted to the UE.

The described collection of statistics could for example be used to complement to the earlier described embodiment of the proposed method that comprised a further step S3 of setting a priority weight for a scheduled grant based on a comparison between signal characteristics of a detected signal and the adjusted threshold values.

Another possible way to achieve an efficient method for determining if a detected signal is a Scheduling Request, SR would basically comprise the steps of detecting a signal and comparing the signal characteristics of the detected signal with two threshold values, an upper threshold and a lower threshold. The upper threshold value providing a reliable indication that the detected signal is a SR and the lower threshold providing a reliable indication the detected signal is not a SR. And then determining, based on the comparison between the signal characteristic and the threshold values whether the detected signal is a SR.

Here the signal characteristics could comprise a measure of the signal strength or a Signal to Noise Ratio, SINR.

In the method it might be determined that the detected signal is a SR if the value of the signal characteristic lies above the upper threshold value.

It could also be determined that the detected signal is not a SR if the value of the signal characteristic lies below the lower threshold value.

Such a method might also comprise counting the number of detected signals from the same UE received within a specified time interval and having signal characteristics that lies between the upper threshold value and the lower threshold value.

Based on this the method might comprise to determine that the detected signals corresponds to a SR if the counted number of detected signals exceeds a specific number.

Such a method could, for example, be performed by a network node such as an eNodeB.

The proposed technology also provide an arrangement 100 configured to enable adaptive detection of Scheduling Requests, SRs,
    wherein the arrangement is configured to obtain information about the responding action to a grant transmitted to a User Equipment, UE, the grant being triggered by an earlier detected signal interpreted as a SR transmitted from the UE; and
    wherein the arrangement is configured to adjust, based on the information obtained, at least one threshold value relevant for determining if a detected signal corresponds to a SR from the UE.

By way of example, the arrangement might be configured to obtain information whether the responding action to the transmitted grant was a message received from the UE and configured to adjust at least one threshold value based on whether a message was received.

In an exemplary embodiment is the arrangement, in the case a message was received as a response to the transmitted grant, configured to obtain, information whether the received message contained uplink data and configured to adjust threshold values by decreasing a threshold value if the received message contained uplink data.

In a particular example is the arrangement, in the case a message was received as a response to the transmitted grant, configured to obtain information whether the received message was padded and contained a zero size buffer report, and configured to adjust threshold values by increasing a threshold value if the received message was padded and contained a zero size buffer report.

In an optional embodiment is the arrangement, in the case no response to the transmitted grant was received, configured to adjust threshold values by increasing a threshold value.

In a possible example of an embodiment is the arrangement, in the case the threshold values comprises two different threshold values, an upper threshold value and a lower threshold value, the upper threshold value providing a threshold value relevant for determining if a detected signal is a SR and the lower threshold value providing a threshold value relevant for determining if a detected signal is not a SR, configured to obtain information about the responding action to a grant transmitted to a User Equipment, UE, as a consequence of an earlier detected signal assumed to be a SR transmitted from the UE and configured to adjust the threshold values based on the responding action to a grant transmitted to a UE triggered by an earlier detected signal interpreted as a SR transmitted from the UE.

In a particular example is the arrangement configured to increase the upper threshold value if the responding action to the transmitted grant was a message received from the UE that contained uplink data and configured to decrease the upper threshold value if the responding action to the transmitted grant was a message received from the UE that was padded and contained a zero size buffer report.

In an exemplary embodiment is the arrangement configured to increase the upper level threshold if no response to the transmitted grant was received from the UE.

By way of example, the arrangement could, in the case no response to the transmitted grant was recorded, be configured to count the number of signals detected within a specified time interval from the same UE having signal characteristics lying between the upper threshold value and the lower threshold value and adjust the upper and lower threshold values based on the counted number of detected signals.

In another optional embodiment is the arrangement configured to compare the counted number of detected signals with a specified number providing indications that the detected signals corresponds to a SR and configured to decrease the upper threshold value if the result of the comparison shows that the counted number is above the specified value.

The arrangement is in a possible embodiment configured to adjust at least one threshold value by adjusting a threshold value for a signal characteristic used to differentiate between a detected SR and a detected general signal.

In an exemplary embodiment of the arrangement is the signal characteristic a measure of the strength of the detected signal.

The arrangement is, in a particular embodiment of the proposed technology, configured to adjust the threshold values with predefined steps that are different based on whether the threshold values should be increased or decreased.

In a possible embodiment is the arrangement also configured to set a priority weight for a scheduled grant based on a comparison between signal characteristics of a detected signal and the adjusted threshold values.

Figure 4:
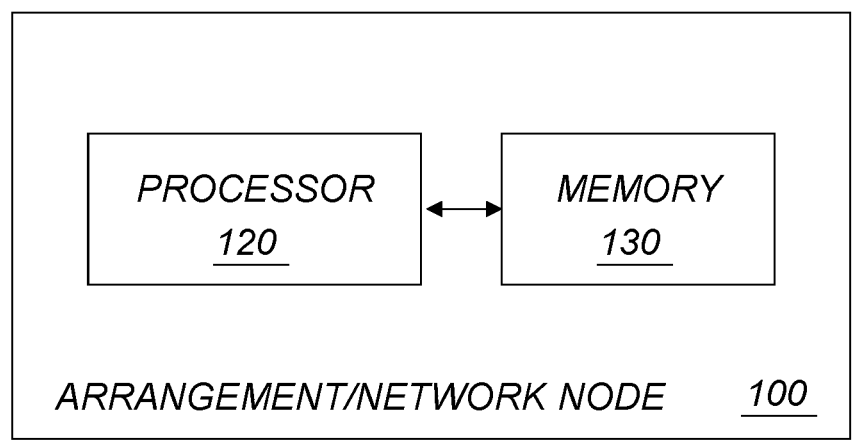
FIG. 4 is a schematic block diagram illustrating an example overview of an arrangement architecture.

FIG. 4 is a schematic block diagram illustrating an example of an arrangement configured to enable an adaptive detection of a Scheduling Request, SR, according to an embodiment.

As exemplified in FIG. 4, the arrangement may comprise a processor 120 and a memory 130, the memory 130 comprising instructions executable by the processor 120, whereby the processor 120 is operative to enable the adaptive SR detection.

In this particular example, at least some of the steps, functions, procedures, modules and/or blocks described herein are implemented in a computer program, which is loaded into the memory for execution by processing circuitry including one or more processors. The processor(s) and memory are interconnected to each other to enable normal software execution. An optional input/output device may also be interconnected to the processor(s) and/or the memory to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

The arrangement might also comprise communication circuitry 110 configured to receive information enabling an adjustment of the at least one threshold values.

Figure 5:
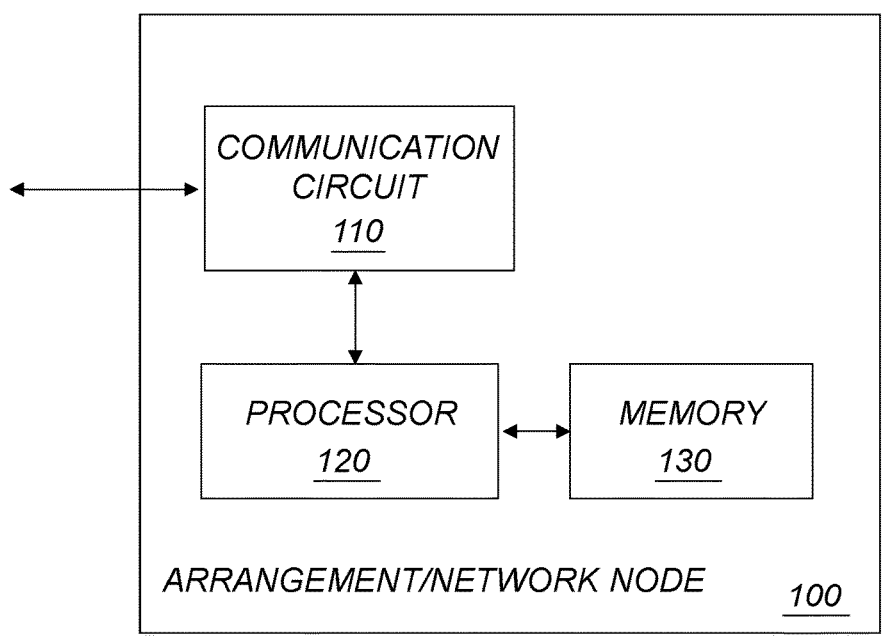
FIG. 5 is a schematic block diagram illustrating an example of an arrangement configured to enable adaptive detection of Scheduling Requests according to an embodiment.

The arrangement may also include radio circuitry for communication with one or more other nodes, including transmitting and/or receiving information. Such an embodiment of the arrangement is schematically illustrated in the block diagram of FIG. 5.

Figure 6:
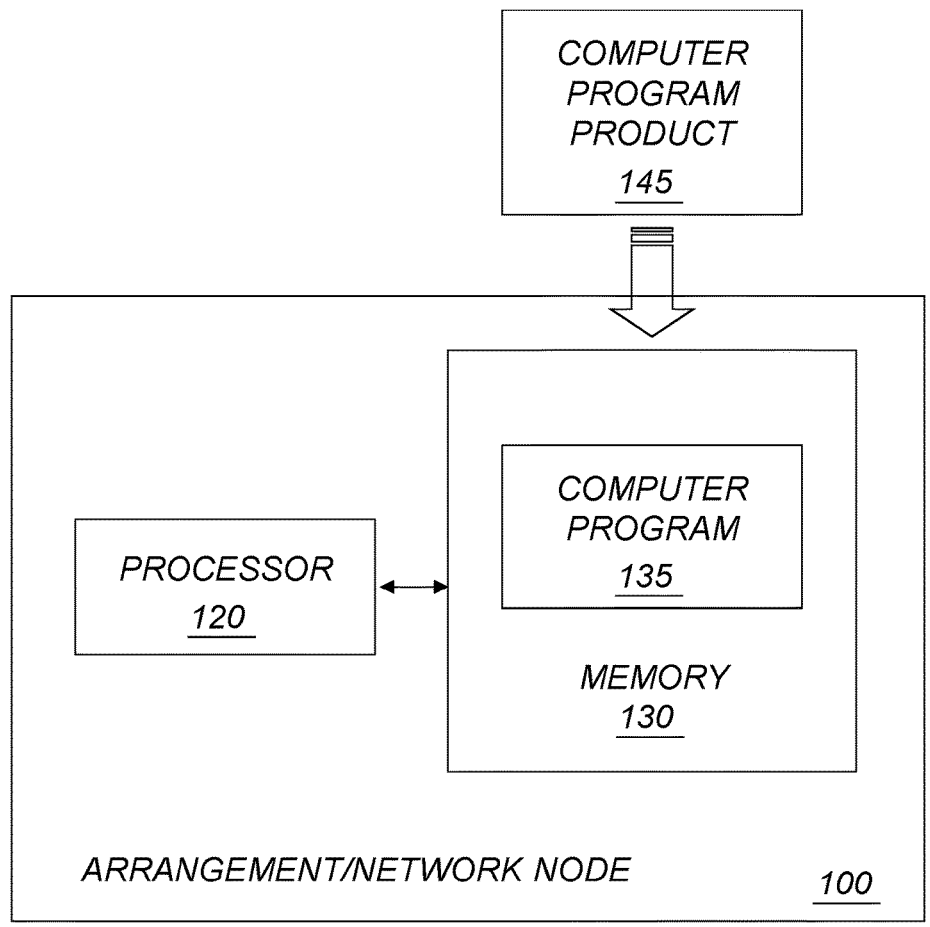
FIG. 6 is a is a schematic block diagram illustrating an example of an arrangement configured to enable adaptive detection of a Scheduling Request, SR, as well as a computer program and corresponding computer program product according to an embodiment.

In FIG. 6 there is schematically illustrated in a block diagram an arrangement operative to enable the adaptive SR detection. Also disclosed is a computer program 135 and a corresponding computer program product 145.

The arrangement described in the various embodiments might be an arrangement comprised in a network node.

As used herein, the non-limiting terms "User Equipment" may refer to a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a target device, a device to device UE, a machine type UE or UE capable of machine to machine communication, iPAD, customer premises equipment, CPE, laptop embedded equipment, LEE, laptop mounted equipment, LME, USB dongle, a portable electronic radio communication device, a sensor device equipped with radio communication capabilities or the like. In particular, the term "UE" and the term "wireless device" should be interpreted as non-limiting terms comprising any type of wireless device communicating with a radio network node in a cellular or mobile communication system or any device equipped with radio circuitry for wireless communication according to any relevant standard for communication within a cellular or mobile communication system.

As used herein, the non-limiting term "network node" or "radio network node" may refer to base stations, network control nodes such as network controllers, radio network controllers, base station controllers, and the like. In particular, the term "base station" may encompass different types of radio base stations including standardized base stations such as Node Bs, or evolved Node Bs, eNodeBs, and also macro/micro/pico radio base stations, home base stations, also known as femto base stations, relay nodes, repeaters, radio access points, base transceiver stations, BTSs, and even radio control nodes controlling one or more Remote Radio Units, RRUs, or the like.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Even though a particular arrangement 100 configured to enable adaptive detection of Scheduling Requests, SRs, have been described, it is possible to implement the proposed method in several distinct but complementary ways.

A specific example of such a way is that the arrangement is comprised in a network node 100, such as a Radio Base Station, RBS. In this way the network node or the RBS 100 will be configured to enable adaptive detection of SRs. Such a network node is disclosed in FIGS. 4-6. The overarching structure of this embodiment is schematically disclosed in FIG. 12A.

Another possible way to implement the method is to provide a central node, such as a Radio Network Controller, RNC, with the task of adjusting the threshold values. In such an architectural embodiment is a network node 100 configured to obtain information about the responding action to a grant transmitted to a User Equipment, UE, where the grant has been triggered by an earlier detected signal interpreted as a SR transmitted from the UE. The obtained information will then be relayed to a Radio Network Controller that is configured to adjust the threshold values based on the information obtained. A schematic overall architectural structure of this embodiment is given in FIG. 12B. In this figure a network node 200 in the form of a Radio Base Station, RBS, obtains the information about the responding action to a grant from a UE 10. This information is then relayed to a RNC 400 over an interface 450, such as an Iub interface. The RNC is configured to adjust the threshold values for the particular UE 10. The adjusted threshold values could then be communicated back to the network node 200 via the interface 450 to be used as new threshold values for subsequent comparisons with detected signals.

In a particular embodiment of the proposed technology, there is also provided a computer program 135 comprising instructions, which when executed by at least one processor, cause the processor(s) to:
  read information about a responding action to a grant transmitted to a User Equipment, UE, the grant being triggered by an earlier detected signal interpreted as a SR transmitted from the UE;
  adjust, based on the information, at least one threshold value relevant for determining if a detected signal corresponds to a SR from the UE.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program may be realized as a computer program product, which is normally carried or stored on a computer-readable medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blueray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may therefore be regarded as a computer flow diagram or diagrams, when performed by one or more processors. A corresponding arrangement may be defined as a group of function modules, where each step performed by the processor corresponds to a function module. In this case, the function modules are implemented as a computer program running on the processor. Hence, the arrangement may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein. An example of such function module is illustrated in FIG. 7.

Figure 7:
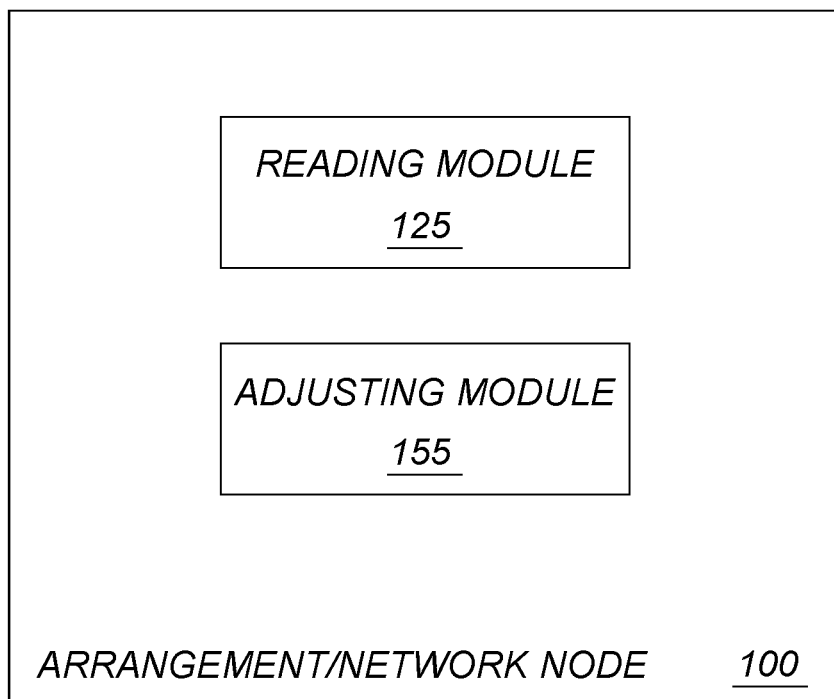
FIG. 7 is a schematic block diagram illustrating an example of an arrangement for enabling adaptive detection of a Scheduling Request according to an embodiment of the proposed technology.

FIG. 7 discloses an arrangement for enabling an adaptive detection of a Scheduling Request, wherein the arrangement comprises:
  a reading module 125 for obtaining information about a responding action to a grant transmitted to a User Equipment, UE, the grant being triggered by an earlier detected signal interpreted as a SR transmitted from the UE;
  an adjusting module 155, for adjusting, based on the information obtained, at least one threshold value relevant for determining if a detected signal corresponds to a SR from the UE.

Alternatively it is possibly to realize the modules in FIG. 7 predominantly by hardware modules, or alternatively by hardware. The extent of software versus hardware is purely implementation selection.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

REFERENCES

[1] 3GPP TS 36.321, VERSION 12.1.0 SECTION 5.4

The invention claimed is:

1. A method for enabling adaptive detection of Scheduling Requests (SRs) wherein the method comprises the steps of:
  obtaining information about a responding action to a grant transmitted to a User Equipment (UE), said grant being triggered by an earlier detected signal interpreted as a SR transmitted from the UE; and
  adjusting, based on the information obtained, at least one threshold value relevant for determining if a detected signal corresponds to a SR from the UE.

2. The method of claim 1, wherein the step of obtaining information comprises obtaining information whether the responding action to the transmitted grant was a message received from the UE and wherein the step of adjusting at least one threshold values is based on whether a message was received.

3. The method of claim 2, wherein, in the case a message was received as a response to the transmitted grant, the step of obtaining information comprises obtaining information whether the received message contained uplink data and wherein the step of adjusting threshold values comprises to decrease a threshold value if the received response contained uplink data.

4. The method of claim 2, wherein, in the case a message was received as a response to the transmitted grant, the step of obtaining information comprises obtaining information whether the received message was padded and contained a zero size buffer report, and wherein the step of adjusting threshold values comprises to increase a threshold value if the received message was padded and contained a zero size buffer report.

5. The method of claim 2, wherein, in the case no response to the transmitted grant was received, the step of adjusting a threshold value comprises to increase said threshold value.

6. The method according to claim 1, wherein said threshold values comprises two different threshold values, an upper threshold value and a lower threshold value, the upper threshold value providing a threshold value relevant for determining if a detected signal is a SR and the lower threshold value providing a threshold value relevant for determining if a detected signal is not a SR, and wherein the step of obtaining information comprises obtaining information about a responding action to a grant transmitted to a UE triggered by an earlier detected signal interpreted as a SR transmitted from the UE and the step of adjusting comprises adjusting the threshold values based on the responding action to a grant transmitted to a UE triggered by an earlier detected signal interpreted as a SR transmitted from the UE.

7. The method of claim 6, wherein, said upper threshold value is increased if the responding action to the transmitted grant is a message received from the UE that contained uplink data and decreased if the responding action to the transmitted grant was a message received from the UE that was padded and contained a zero size buffer report.

8. The method according to claim 6, wherein said upper level threshold is increased if no response to the transmitted grant was received from the UE.

9. The method according to claim 6, wherein, in the case no response to the transmitted grant was recorded, the step of obtaining information comprises the further the step of counting the number of detected signals within a specified time interval from the same UE having signal characteristics lying between the upper threshold value and the lower threshold value and adjust said upper and lower threshold values based on the counted number of detected signals.

10. The method of claim 9, further comprising the step of comparing the counted number of detected signals with a specified number providing indications that the detected signals corresponds to a SR and wherein the upper threshold value is decreased if the comparison shows that the counted number is above the specified value.

11. The method of claim 1, wherein said at least one threshold value comprises a threshold value for a signal characteristic used to differentiate between a detected SR and a detected general signal.

12. The method of claim 11, wherein said signal characteristic is a measure of the strength of the detected signal.

13. The method according to claim 1, wherein the threshold values are adjusted with predefined steps that are different based on whether the threshold values should be increased or decreased.

14. The method according to claim 1, wherein said method comprises the further step of setting a priority weight for a scheduled grant based on a comparison between signal characteristics of a detected signal and said adjusted threshold values.

15. A network node configured to enable adaptive detection of Scheduling Requests (SRs), wherein the network node is configured to obtain information about the responding action to a grant transmitted to a User Equipment (UE), said grant being triggered by an earlier detected signal interpreted as a SR transmitted from the UE; and
wherein the network node is configured to adjust, based on the information obtained, at least one threshold value relevant for determining if a detected signal corresponds to the detection of a SR from the UE.

16. The network node of claim 15, wherein the network node is configured to obtain information whether the responding action to the transmitted grant was a message received from the UE and configured to adjust at least one threshold value based on whether a message was received.

17. The network node of claim 16, wherein the network node, in the case a message was received as a response to the transmitted grant, is configured to obtain, information whether the received message contained uplink data and configured to adjust threshold values by decreasing a threshold value if the received message contained uplink data.

18. The network node of claim 16, wherein the network node, in the case a message was received as a response to the transmitted grant, is configured to obtain information whether the received message was padded and contained a zero size buffer report, and configured to adjust threshold values by increasing a threshold value if the received message was padded and contained a zero size buffer report.

19. The network node of claim 16, wherein the network node, in the case no response to the transmitted grant was received, is configured to adjust threshold values by increasing a threshold value.

20. The network node according to claim 15, wherein the network node, in the case said threshold values comprises two different threshold values, an upper threshold value and a lower threshold value, the upper threshold value providing a threshold value relevant for determining if a detected signal is a SR and the lower threshold value providing a threshold value relevant for determining if a detected signal is not a SR, is configured to obtain information about the responding action to a grant transmitted to a UE as a consequence of an earlier detected signal assumed to be a SR transmitted from the UE and configured to adjust the threshold values based on the responding action to a grant transmitted to a UE triggered by an earlier detected signal interpreted as a SR transmitted from the UE.

21. The network node of claim 20, wherein the network node is configured to increase the upper threshold value if the responding action to the transmitted grant was a message received from the UE that contained uplink data and configured to decrease the upper threshold value if the responding action to the transmitted grant was a message received from the UE that was padded and contained a zero size buffer report.

22. The network node according to claim 20, wherein said network node is configured to increase said upper level threshold if no response to the transmitted grant was received from the UE.

23. The network node according to claim 20, wherein the network node, in the case no response to the transmitted grant was recorded, is configured to count the number of signals detected within a specified time interval from the same UE having signal characteristics lying between the upper threshold value and the lower threshold value and adjust said upper and lower threshold values based on the counted number of detected signals.

24. The network node according to claim 23, wherein the network node is configured to compare the counted number of detected signals with a specified number providing indications that the detected signals corresponds to a SR and configured to decrease the upper threshold value if the result of the comparison shows that the counted number is above the specified value.

25. The network node according to claim 15, wherein the network node is configured to adjust at least one threshold value by adjusting a threshold value for a signal characteristic used to differentiate between a detected SR and a detected general signal.

26. The network node of claim 25, wherein said signal characteristic is a measure of the strength of the detected signal.

27. The network node according to claim 15, wherein the network node is configured to adjust the threshold values with predefined steps that are different based on whether the threshold values should be increased or decreased.

28. The network node according to claim 15, wherein the network node is configured to set a priority weight for a scheduled grant based on a comparison between signal characteristics of a detected signal and said adjusted threshold values.

29. The network node according to claim 15, wherein the network node comprises a processor and a memory, said memory comprising instructions executable by the processor, whereby the processor is operative to enable said adaptive SR detection.

30. The network node according to claim 29, wherein the network node comprises communication circuitry configured to receive information enabling an adjustment of said at least one threshold values.

31. A computer program product comprising a non-transitory computer readable storage medium storing instructions, which when executed by at least one processor, cause the processor(s) to:
read information about a responding action to a grant transmitted to a User Equipment (UE), said grant being triggered by an earlier detected signal interpreted as a SR transmitted from the UE; and
adjust, based on the information, at least one threshold value relevant for determining if a detected signal corresponds to a SR from the UE.

32. A network node for enabling an adaptive detection of Scheduling Requests (SRs), wherein the network node comprises:
at least one processor;
at least one memory, said memory comprising instructions executable by the processor, whereby the processor is configured to:
obtain information about a responding action to a grant transmitted to a User Equipment (UE), said grant being triggered by an earlier detected signal interpreted as a SR transmitted from the UE; and
adjust, based on the information obtained, at least one threshold value relevant for determining if a detected signal corresponds to a SR from the UE.

33. The method of claim 1 further comprising:
receiving a scheduling request from the User Equipment;
transmitting the grant to the User Equipment responsive to receiving the scheduling request; and
receiving data from the User Equipment in accordance with the grant;
wherein the responding action comprises the receiving data from the User Equipment, wherein the earlier detected signal comprises the scheduling request, and wherein determining if a detected signal corresponds to a SR from the UE comprises determining if a subsequently detected signal corresponds to a subsequent SR from the UE.

34. The method of claim 33, wherein receiving the scheduling request comprises receiving a first scheduling request, the method further comprising:
after adjusting the at least one threshold value, determining if a subsequent detected signal corresponds to a second SR from the UE based on the adjusted at least one threshold value.

* * * * *